United States Patent [19]

Dearman

[11] 4,431,173

[45] Feb. 14, 1984

[54] WELDERS PLATE ALIGNMENT TOOL

[76] Inventor: Timothy C. Dearman, P.O. Box 937, Pearland, Tex. 77581

[21] Appl. No.: 486,105

[22] Filed: Apr. 18, 1983

Related U.S. Application Data

[63] Continuation of Ser. No. 337,482, Jan. 1, 1982, abandoned.

[51] Int. Cl.$^3$ ............................................... B25B 5/14
[52] U.S. Cl. ..................................................... 269/49
[58] Field of Search ..................... 269/43, 49, 37, 43, 269/243, 246, 250; 228/49 B, 49 C

[56] References Cited

U.S. PATENT DOCUMENTS

| | | | |
|---|---|---|---|
| 359,815 | 3/1887 | Sargent | 269/49 |
| 1,309,067 | 7/1919 | Heltzel | 269/49 |
| 2,952,282 | 9/1960 | McHenry | 269/47 |
| 3,588,082 | 6/1971 | Chiffoleau | 269/49 |
| 3,666,159 | 5/1972 | Watson | 269/43 |
| 3,711,920 | 1/1973 | Simmons | 269/43 |
| 3,952,936 | 4/1976 | Dearman | 269/43 |
| 4,175,735 | 11/1979 | Griffin | 269/49 |
| 4,195,828 | 4/1980 | Peterson | 228/49 B |

FOREIGN PATENT DOCUMENTS

| | | | |
|---|---|---|---|
| 1166311 | 11/1958 | France | 269/49 |
| 551276 | 2/1953 | United Kingdom | 269/49 |

Primary Examiner—Robert C. Watson
Attorney, Agent, or Firm—Learman & McCulloch

[57] ABSTRACT

A welder's tool for use in adjusting the confronting edges of two plates to be welded together comprises a force applying body having legs adapted to straddle a gap between the edges and a bridge joining the legs, the bridge having an opening therein through which extends an axially adjustable drawbar terminating at one end in a carrier of such thickness as to pass through the gap. The carrier has an opening therein through which extends a force transmitting member that is of such length as to span the gap and engage both of the plates on opposite sides of the gap. Adjustment of the drawbar in one direction effects movement of the force transmitting member in a direction to bear on the corresponding surfaces of both plates and locate such surfaces in a common plane. The force transmitting member carries at one end thereof an adjustable thrust member which is operable to bear against one of the two plates to enable relative adjustment of the two plates so that the surfaces thereof confronting the force transmitting member may be located in different planes.

8 Claims, 6 Drawing Figures

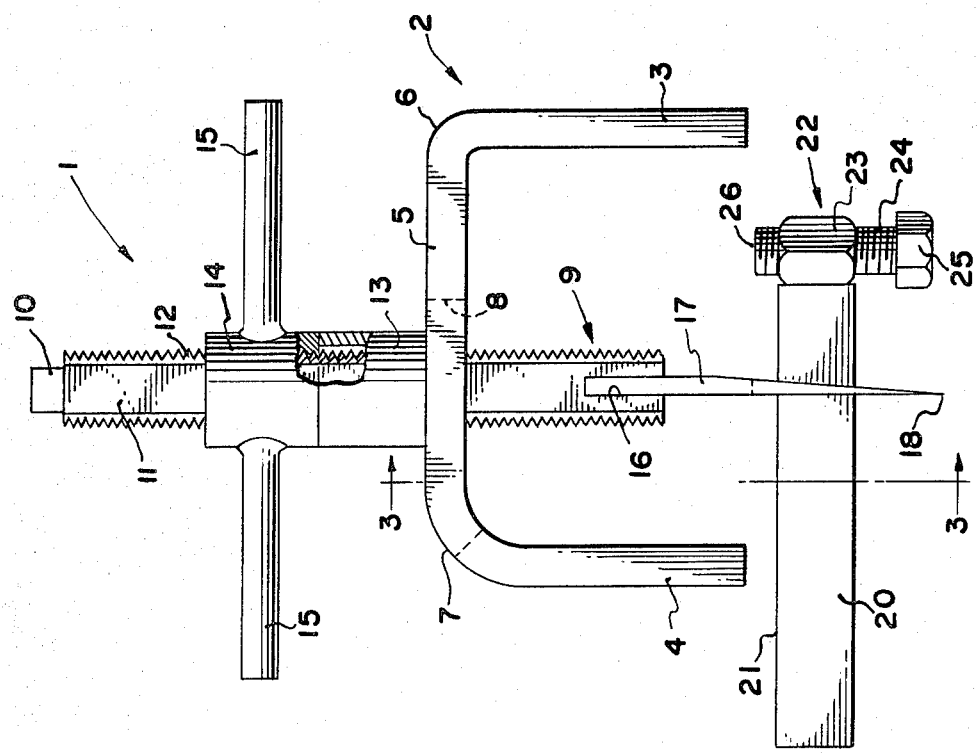

WELDERS PLATE ALIGNMENT TOOL

This is a continuation, of application Ser. No. 337,482 filed Jan. 1, 1982 now abandoned.

BACKGROUND OF THE INVENTION

Preparatory to welding a pair of metal plates and the like to one another it is necessary that the two plates be so positioned relatively to one another that a proper weld may be achieved. In preparing the two plates to be welded together, they usually are positioned adjacent one another with the edges to be welded confronting one another and spaced by a gap. It is rather uncommon for the confronting edges of the two members to match perfectly. On the contrary, more often than not the confronting edges are mismatched. That is, warpage, bending, or other distortion of the plates commonly will cause a surface of one member to be non-planar with the corresponding surface of the other plane. Further, it often is necessary to weld together two plates of different thicknesses and in such manner that corresponding surfaces at one side only of such plates are coplanar.

To correct non-planar conditions caused by warpage, deformation, or other distortion, it is common to use various kinds of shims, clamps, and the like which enable the confronting edges of a pair of plates to be adjusted relative to one another so that at least one surface of one plate is coplanar with the corresponding surface of the other plate. A tool for such purpose is illustrated in U.S. Pat. No. 4,175,734.

It is not uncommon that plates of different thicknessess are to be welded to one another. In such cases, it sometimes is desirable that corresponding surfaces of the plates be coplanar and the opposite corresponding surfaces of the plates be stepped. In other cases, however, it is desirable that both surfaces be stepped at the juncture of such plates. A tool adapted for use in the welding together of plates of different thicknesses is disclosed in U.S. Pat. No. 2,672,839.

Tools of the kind disclosed in the aforementioned patents have limitations in their effectiveness for a number of reasons, a principal one of which is that the tool parts that are adapted to span a gap between a pair of plates and be located on opposite sides of the plates are symmetrical on opposite sides of the gap, as a consequence of which forces applied to the plates on opposite sides of the gap are equal. In a construction in which the force applying member applies equal forces to two members on opposite sides of a gap, it is difficult, if not impossible, to achieve the application of a greater effective force on one side of the gap than on the other once corresponding surfaces of the plates on opposite sides of the gap have been brought into coplanar relationship. Thus, it may not be possible to adjust the plates so that the corresponding surfaces on a selected side of such plates are planar or non-planar, or so that a thinner plate is stepped on both sides of its juncture with a thicker plate.

A tool constructed in accordance with the invention overcomes the disadvantages of the known tools by providing force applying means applicable to opposite sides of a pair of plates, each of the force applying members being capable of adjustments relative to the other so as to enable forces of different effective magnitude to be applied on opposite sides of a gap that is spanned by such members.

SUMMARY OF THE INVENTION

A tool constructed in accordance with the invention comprises a force applying body member having two spaced apart legs joined by a bridge in which there is a slot for the accommodation of a drawbar having a threaded exterior fitted with a coaxial sleeve by means of which the drawbar may be moved axially relative to the bridge. The body member is adapted to span a gap between the confronting edges of a pair of plates that are to be welded together with one leg bearing on one surface of one plate and the other leg bearing on the corresponding surface of the other plate. The drawbar terminates at one end in a carrier which may extend through the gap between the plates. The carrier has an opening therein in which is slidably mounted a force transmitting member in the form of an elongate bar and which is adapted to confront those surfaces of the plates which are opposite the surfaces engaged by the legs of the body member. At one end the force transmitting bar has an adjustable thrust member which may be caused to bear against one of the plates to enable adjustment of the position of the latter relative to the other plate.

DESCRIPTION OF THE DRAWINGS

Apparatus constructed in accordance with the invention is disclosed in the following description and the accompanying drawings, wherein:

FIG. 1 is a side elevational view, partly broken away, of one embodiment of an aligning tool;

FIG. 2 is an end elevational view with one part broken away for clarity of illustration;

FIG. 3 is a sectional view taken on the line 3—3 of FIG. 1;

FIG. 6 is a fragmentary detail view illustrating a modification.

THE PREFERRED EMBODIMENTS

Figure 5:
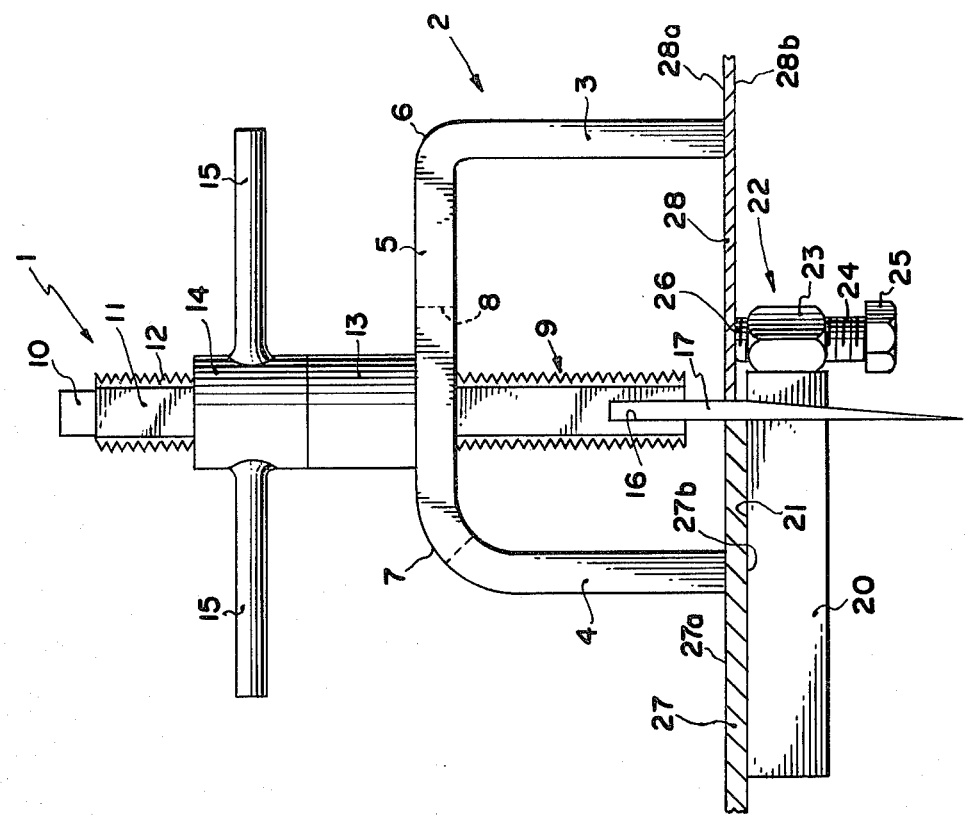
FIG. 5 is a view similar to FIG. 4, but illustrating the tool and the plates in adjusted positions.

A tool constructed in accordance with the embodiment illustrated in FIGS. 1–5 is designated generally by the reference character 1 and comprises a U-shaped, force applying body member 2 having spaced, parallel legs 3 and 4 of uniform height joined at corresponding ends by a bridge 5. The body corresponds to that disclosed in copending application Ser. No. 302,970 filed Sept. 17, 1981, now U.S. Pat. No. 4,392,641. The opposite or free ends of the legs are coplanar. The juncture 6 between the leg 3 and the bridge 5 may be fairly abrupt, whereas the juncture 7 between the leg 4 and the bridge 5 is formed on an arc having a radius considerably larger than that of the juncture 6. The bridge 5 has an elongate slot or opening 8 therein, one end of which parallels the leg 3 and the opposite end of which is inclined to the leg 3. The one end of the slot 8 is located adjacent the middle of the bridge 5, whereas the opposite site end is adjacent the leg 4 and extends into the curved juncture 7.

The tool 1 also includes a drawbar 9 comprising an elongate stem 10 having two sides 11 flattened and the remaining exterior surfaces threaded as shown at 12. The size and shape of the stem 10 are such that it is slideable within the slot 8, but cannot rotate relative to the body 2.

The stem 10 extends through a drive transmitting cylinder 13 having a smooth bore and which rests upon the upper surface of the bridge 5. Threaded onto the stem 10 is an interiorly threaded driving sleeve 14 to which is fixed a pair of radially extending arms 15 to facilitate rotation of the sleeve.

That end of the drawbar 9 which lies between the legs 3 and 4 is provided with a transverse slot 16 in which is accommodated and welded one end of a carrier 17 which may taper toward its free end 18. The carrier has a coupling opening 19 (see FIG. 3) through which slideably extends a force transmitting bar member 20 having a planar, elongate surface 21 facing the bridge 5. The widths of the opening 19 and the member 20 correspond substantially to one another, but with a sufficient difference to enable free sliding movement of the member 20 relative to the carrier 17. The height of the member 20 is less than that of the opening 19, however, so as to enable the member 20 to rock in its own plane relative to the carrier and to be moved bodily vertically relative to the carrier.

At one end of the force transmitting member 20 is an adjustable thrust device 22 comprising a nut 23 welded to the member 20 and through which extends a threaded shaft 24 having a head 25 at one of its ends. The free end or foot 26 of the shaft 24 confronts the bridge 5 and is extensible and retractable with respect to the plane of the surface 21.

Figure 4:
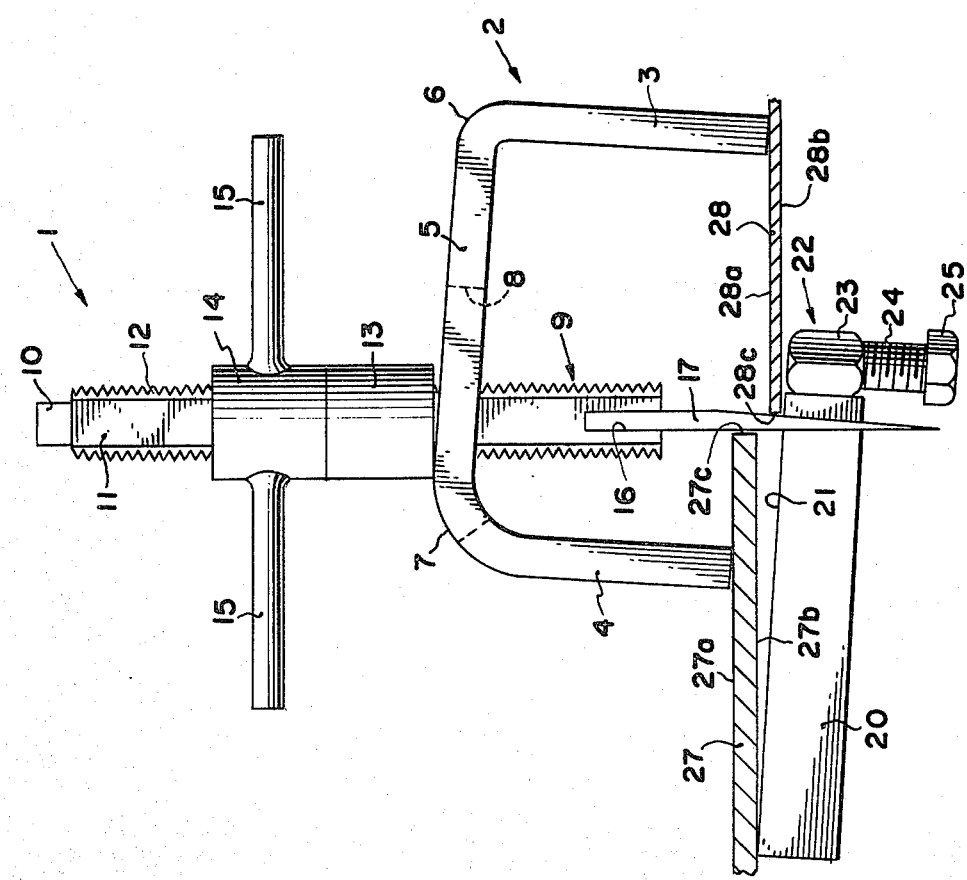
FIG. 4 is a view similar to FIG. 1, but illustrating the tool preparatory to being used for aligning two plates of different thicknesses.

In FIG. 4 the tool 1 is illustrated as being used to align two metal plates 27 and 28 of different thicknesses. The plate 27 has upper and lower surfaces 27a and 27b, respectively, and one edge 27c, and the plate 28 has upper and lower surfaces 28a and 28b, respectively, and an edge 28c confronting the edge 27c. The plates 27 and 28 are shown as being so positioned that no surface of one plate is coplanar with any surface of the other plate.

The positions of the parts illustrated in FIG. 4 are those occupied by the tool and the plates when the tool is conditioned for use in adjusting the relative positions of the plates. In the case illustrated in FIG. 4, it is desired to adjust the relative positions of the plates 27 and 28 in such manner that as to locate the lower surfaces 27b and 28b in the same plane with the edges 27c and 28c in direct confrontation but spaced by a gap. Thus, the carrier 17 extends through the gap which exists between the confronting edges 27c and 28c of the plate and the body 2 is oriented in such manner that the plates 3 and 4 straddle the gap and bear upon the upper surfaces 27a and 28a of the respective plates. The size of the gap may be determined by that part of the tapered carrier which engages the edges of the plates.

It will be understood that the member 20 may be withdrawn from the opening 19 in the carrier 17 prior to the time that the latter is thrust through the gap between the plates 27 and 28, and is refitted into the opening 19 afterwards.

To effect alignment of the plates 27 and 28 as shown in FIG. 4, the plate 27 should be moved downwardly and plate 28 should be moved upwardly. Such movements may be facilitated by positioning the drawbar 9 more closely to the leg 4 than to the leg 3, thereby establishing a longer lever arm between the carrier 17 and the leg 3, and by adjusting the bar member 20 relative to the carrier to establish desired lever arms on opposite sides of the carrier.

Rotation of the driving sleeve 14 in one direction when the parts are in the positions shown in FIG. 4 will cause upward movement of the drawbar 9 so as to effect engagement between the left hand end of the member 20 and the surface 27b of the plate 27. Thereafter, continued rotation of the driving sleeve 14 in such direction will cause the right hand end of the member 20 to engage the surface 28b of the plate 28 and transmit an upward force on the latter. Since the lever arm between the carrier 17 and the leg 3 is greater than the lever arm between the carrier and the leg 4, the upward force transmitted to the plate 28 by the member 20 will enable the plate 28 to be displaced upwardly, accompanied by counterclockwise rocking of the body 2. The member 20 also will be rocked counterclockwise about its engagement with the plate 27 until such time as its surface 21 is flush with the lower surface 27b of the plate 27. If the foot 26 of the thrust device 22 is at or below the level of the surface 21, the maximum upward movement of which the plate 28 is capable is that which will locate the lower surface 28b in the same plane as the lower surface 27b of the plate 27. Thus, the two plate surfaces 27b and 28b will be coplanar, but there will be a step between the opposite surfaces 27a and 28b.

Following final adjustment of the positions of the plates 27 and 28 the latter may be tack welded along opposite sides of the carrier 17. Thereafter, the driving sleeve 14 may be rotated in a direction to disengage the surface 21 of the member 20 from the plates 27 and 28, following which the member 20 may be withdrawn from the slot in the carrier 17 and the entire tool removed from the two plates and the welding operation finished.

The apparatus shown in FIG. 5 is the same as that disclosed in FIG. 4, but in the case illustrated in FIG. 5 it is desired that the upper surfaces 27a and 28a be made coplanar. This may be accomplished by adjusting the thrust screw 24 in such manner as to cause its foot 26 to protrude beyond the surface 21 of the bar 20 a distance corresponding to the difference in thickness between the plates 27 and 28. Thus, when the member 20 has been adjusted so that its surface 21 is flush with the lower surface 27b of the plate 27 the surface 28a of the plate 28 will be coplanar with the surface 28a and there will be a step between the surfaces 27b and 28b. Adjustment of the thrust screw 24 may take place either before or after the surface 21 of the bar 20 is flush with the lower surface 27b of the plate 27.

It will be understood that the adjusting screw 24 may be adjusted in such manner as to locate the plate 28 in a position in which the surfaces 27a and 27b of the plate extend beyond both of the corresponding surfaces of the plate 28 so as to provide a step between the surfaces 27a, 28a and 27b, 28b. It also will be understood that the drawbar 9 may be adjusted longitudinally of the slot 8 between positions in which the longitudinal axis of the drawbar is midway between the legs 3 and 4, and that the force transmitting bar 20 may be adjusted longitudinally to locate the thrust device 22 at any selected distance from the carrier 17. Thus, the lever arms of both the body 2 and the member 20 are adjustable.

The embodiment shown in FIG. 6 corresponds to the earlier described embodiment with the exception that the drawbar 9 has fixed to its lower end a pair of spaced apart supports 30 and 31 between which a carrier 17' like the carrier 17 is removably mounted by means of a nut and bolt assembly 32 which extends through aligned openings in the supports 30, 31 and in the carrier 17'. The removability of the carrier 17' facilitates use of the tool in those instances in which a greater or lesser gap is desired or in which it would be awkward or inconvenient for one person to remove, replace, and adjust the force applying member 20 with respect to its carrier from one side of a pair of plates.

It is not necessary that the carrier 17 or 17' be tapered. It may be of uniform thickness if desired.

Although the tool disclosed herein has been described with reference to its use to align or adjust the relative positions of plates, it should be understood that the tool may be used in a similar manner to align or adjust a pipe with another pipe, or a valve, or a fitting, or other device.

The disclosed embodiments are representative of presently preferred forms of the invention, but are intended to be illustrative rather than definitive thereof. The invention is defined in the claims.

I claim:

1. A welding tool for use in positioning in predetermined locations confronting edges of two members to be welded together and spaced by a gap, said tool comprising a U-shaped body having parallel legs engageable with one side of said members and being spaced apart by a bridge joining said legs at corresponding ends, the spacing between said legs enabling such legs to straddle the gap between said edges, said bridge having an opening therein; a drawbar extending through the opening in said bridge for reciprocable movements in opposite directions transversely of said bridge; a carrier at one end of said drawbar of such thickness as to pass through said gap, said carrier having a slot extending transversely therethrough; a force transmitting bar accommodated in the slot of said carrier for sliding movements transversely of said carrier substantially parallel to said bridge and being of such length as to span said gap and engage both of said members on opposite sides of said gap, said force transmitting bar having a flat, linear surface confronting but spaced from said bridge a distance to enable such surface to engage said members on the side opposite that engaged by the legs of said body; adjustable thrust applying means; means mounting said thrust applying means on said force transmitting bar for movements transversely thereof toward and away from said bridge from a first position in which said thrust applying means does not extend beyond said surface of said force transmitting bar to a selected one of a number of other positions in which said thrust applying means does extend beyond said surface of said force transmitting bar and is engageable with one only of said members on one side of said gap; and rotary driving means independent of said thrust applying means carried by said drawbar for driving the latter relatively to said body in directions to enable said carrier and said force transmitting bar to be displaced conjointly in directions toward and away from said bridge.

2. A tool according to claim 1 wherein said opening in said bridge is elongate and extends from a point at about the center of said bridge toward one of said legs, said opening terminating closer to said one of said legs than to the other of said legs.

3. A tool according to claim 1 wherein said drawbar has a cross-sectional size and shape so related to the size of the opening in said bridge as to prevent rotation of said drawbar relative to said bridge.

4. A welding tool for use in positioning in predetermined locations confronting edges of two members to be welded together and spaced by a gap, said tool comprising a body having spaced, substantially parallel legs adapted to straddle the gap between said edges; a bridge joining said legs; a drawbar carried by said bridge for reciprocable movements transversely thereof and terminating at one end in a carrier of such thickness as to pass through said gap; force transmitting means of such length as to span said gap and engage both of said members on opposite sides of said gap; means coupling said carrier and said force transmitting means and enabling sliding movements of the latter in directions substantially parallel to said bridge; driving means carried by said drawbar for driving the latter relatively to said body in directions to enable said force transmitting means to be displaced selectively toward and away from said bridge; adjustable thrust applying means; and means mounting said thrust applying means on said force transmitting means for movements with the latter and for movements independently of said force transmitting means in directions toward and away from said bridge.

5. A tool according to claim 4 wherein said coupling means enables rocking movements of said force transmitting means relative to said carrier.

6. A tool according to claim 4 wherein said coupling means comprises a slot in said carrier and in which said force transmitting means is accommodated.

7. A tool according to claim 6 wherein said slot has a height greater than that of said force transmitting means.

8. A tool according to claim 4 wherein said force transmitting means comprises an elongate bar having a smooth, flat, linear surface confronting said bridge.

* * * * *